(12) United States Patent
Gumpoltsberger

(10) Patent No.: US 7,175,562 B2
(45) Date of Patent: Feb. 13, 2007

(54) MULTI-STAGE TRANSMISSION

(75) Inventor: Gerhard Gumpoltsberger, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 39 days.

(21) Appl. No.: 10/758,742

(22) Filed: Jan. 16, 2004

(65) Prior Publication Data
US 2004/0147357 A1 Jul. 29, 2004

(30) Foreign Application Priority Data
Jan. 21, 2003 (DE) ................. 103 02 024

(51) Int. Cl.
*F16H 3/62* (2006.01)
(52) U.S. Cl. ..................................... 475/276
(58) Field of Classification Search ............... 475/275, 475/276, 277, 278, 282, 284, 286
See application file for complete search history.

(56) References Cited

U.S. PATENT DOCUMENTS

| | | | | |
|---|---|---|---|---|
| 4,368,649 A | * | 1/1983 | Vahratian et al. ............. 475/66 |
| 5,106,352 A | | 4/1992 | Lepelletier ................. 475/280 |
| 5,261,862 A | * | 11/1993 | Pierce ........................ 475/275 |
| 5,435,792 A | * | 7/1995 | Justice et al. ................ 475/276 |
| 5,599,251 A | * | 2/1997 | Beim et al. .................. 475/275 |
| 6,422,969 B1 | * | 7/2002 | Raghavan et al. .......... 475/276 |
| 6,572,507 B1 | | 6/2003 | Korkmaz et al. ........... 475/276 |
| 6,634,980 B1 | | 10/2003 | Ziemer ...................... 475/275 |

FOREIGN PATENT DOCUMENTS

| | | |
|---|---|---|
| DE | 199 12 480 A1 | 9/2000 |
| DE | 199 49 507 A1 | 4/2001 |
| DE | 101 15 983 A1 | 10/2002 |
| EP | 0 434 525 A1 | 6/1991 |
| EP | 1 118 798 A2 | 7/2001 |
| JP | 2000291747 A | 10/2000 |
| JP | 3519037 | * 4/2004 |

OTHER PUBLICATIONS

Tenberge, Prof. Dr., . "E-Automat Automatikgetriebe mit Esprit", *VDI-Berichte*, No. 1610, (2001), pp. 455-479.

* cited by examiner

*Primary Examiner*—Ha Ho

(57) ABSTRACT

A multi-stage automatic transmission of planetary structure in which gears and clutches are selectively engaged, two at a time, to produce various transmission ratios between the drive input shaft and the drive output shaft so that six forward gears and one reverse gear are engageable. The transmission includes three planetary gearsets, two negative planetary gear sets and one positive planetary gear sets, first and second clutches and first, second and third brakes.

23 Claims, 5 Drawing Sheets

|  | 03 | 04 | 13 | 16 | 05 15 | i | φ |
|---|---|---|---|---|---|---|---|
| 1. | ● |   |   | ● |   | 3,842 | 1,854 |
| 2. |   | ● |   | ● |   | 2,073 | 1,405 |
| 3. |   |   |   | ● | ● | 1,475 | 1,475 |
| 4. |   |   | ● | ● |   | 1,000 | 1,377 |
| 5. |   |   | ● |   | ● | 0,726 | 1,166 |
| 6. |   | ● | ● |   |   | 0,623 | 1,000 |
| R. | ● |   |   |   | ● | -4,373 |   |

Fig. 5

MULTI-STAGE TRANSMISSION

This application claims priority from German Application Serial No. 10302024.1 filed Jan. 21, 2003.

FIELD OF THE INVENTION

The present invention concerns a multi-stage transmission of planetary structure, in particular an automatic transmission for a motor vehicle.

BACKGROUND OF THE INVENTION

Automatic transmissions of the prior art, in particular for motor vehicles, comprise planetary gearset assemblies which are engaged by means of frictional or shift elements such as clutches and brakes and are usually connected to a starting element such as a hydrodynamic torque converter or a fluid clutch that can operate with some slipping action and is optionally provided with a bridging clutch.

Such a transmission is described in EP 0 434 525 A1. It comprises essentially a drive input shaft and a drive output shaft arranged parallel to one another, a dual planetary gearset assembly concentric to the drive output shaft, and five shift elements in the form of three clutches and two brakes, whose selective engagement, two at a time, determines the various gear transmission ratios between the drive input and drive output shafts.

Furthermore, from DE 199 495 07 A1 by the present applicant a multi-stage transmission is known, in which two non-shifting main gearset combinations are provided, which produce two rotation speeds on the output side which, besides the speed of the drive input shaft, can optionally be engaged with a shiftable dual planetary gearset assembly that acts on the drive output shaft, by selectively closing the shift elements used in such manner that to shift from one gear to the respective next gear up or down, only one shift element of the two shift elements actuated at the time has to be engaged or disengaged.

In addition, within the scope of EP 0 434 525 A1 a multi-stage transmission is disclosed, which contains a drive input shaft and a drive output shaft arranged in a housing, a planetary gearset assembly arranged concentrically with the drive output shaft consisting of four elements denoted as from the first to the fourth in the order of their speed, i.e. a so-termed double planetary gearset assembly, and five shift elements, namely three clutches and two brakes, whose selective actuation in pairs determines various transmission ratios between the drive input and drive output shafts, such that the transmission has two power paths which enable six forward gears to be engaged by the selective actuation of the five shift elements two at a time.

The purpose of the present invention is to propose a multi-stage transmission of the type described at the start, in which the structural elaboration is optimised and, in addition, the efficiency in the main gears is improved in relation to slippage and gearing losses.

SUMMARY OF THE INVENTION

According to the invention, the multi-stage transmission of planetary structure comprises a drive input shaft and a drive output shaft arranged in a housing, at least three single-web planetary gearset assemblies, the first single-web planetary gearset assembly defining a fixed input transmission ratio for the second planetary gearset, at least six rotating shafts and at least five shift elements, preferably two brakes and three clutches or three brakes and two clutches, whose selective engagement in pairs produces various transmission ratios between the drive input and the drive output shafts, so that preferably six forward gears and one reverse gear can be engaged.

In this case the drive output is via a shaft connected to the annular gear wheel of the second planetary gearset and to the web of the third planetary gearset, a further, third shaft being permanently connected to the web of the second planetary gearset and to the annular gear wheel of the third planetary gearset, and a further, fourth shaft being permanently connected to the solar gear wheel of the second planetary gearset and to the annular gear wheel of the first planetary gearset; another shaft is permanently connected to the solar gear wheel of the third planetary gearset.

In a first preferred embodiment comprising two brakes and three clutches, the drive input shaft is also connected via a clutch to the solar gear wheel and to the web of the first planetary gearset and the web or the solar gear wheel of the first planetary gearset is in rotationally fixed connection with the housing. In addition, a shaft is permanently connected to the solar gear wheel or to the web of the first planetary gearset.

According to the invention a second embodiment is proposed, which contains three brakes and two clutches and in which the drive input shaft is connected directly to the solar gear wheel or web of the first planetary gearset, the web or solar gear wheel of the first planetary gearset can be put in rotationally fixed connection with or released from the housing via a brake, and a shaft is permanently connected to the web or solar gear wheel of the first planetary gearset.

In this case the planetary gearset assemblies are coupled by means of shift elements and/or shafts; preferably, the first planetary gearset is made as a positive planetary gearset and the second and third planetary gearset as negative planetary gear sets.

Thanks to the construction according to the invention, suitable transmission ratios and a considerable increase of the overall spread of the multi-stage transmission are obtained, which results in increased driving comfort and a significant reduction of fuel consumption.

The multi-stage transmission according to the invention is suitable for any motor vehicle, in particular for passenger cars and goods vehicles such as trucks, buses, construction industry vehicles, rail vehicles, caterpillar track vehicles and suchlike.

Moreover, with the multi-stage transmission according to the invention, the structural elaboration is reduced considerably by having a small number of shift elements, namely preferably only three clutches and two brakes or two clutches and three brakes.

Advantageously, the multi-stage transmission according to the invention makes it possible to start up with a hydrodynamic converter, an external starting clutch or even some other suitable external starting element. It is also conceivable to enable a starting process with a starting element integrated in the transmission. Furthermore, the multi-stage transmission according to the invention operates with high efficiency in relation to slippage and gearing losses.

In addition, the torques in the shift elements and even in the planetary gearset assemblies are small. This reduces wear in the multi-stage transmission in a particularly advantageous way. Owing to the low torques in the shift elements and planetary gearset assemblies the transmission can be made smaller, which optimises the use of structural space and leads to cost reduction.

Furthermore, the transmission according to the invention is designed to allow adaptability to various drive train designs, both in the force-flow direction and from the standpoint of space.

BRIEF DESCRIPTION OF THE DRAWINGS

The invention will now be described, by way of example, with reference to the accompanying drawings in which:

FIG. 5 is a shift scheme for the multi-stage transmission according to the invention, as illustrated in FIGS. 1, 2, 3 and 4;

DETAILED DESCRIPTION OF THE INVENTION

Figure 1:
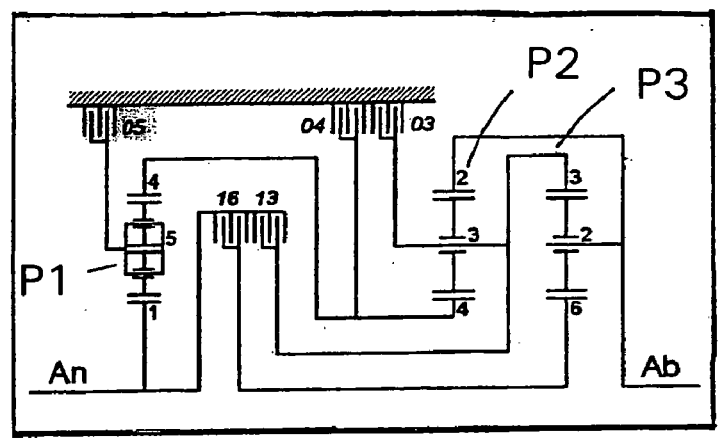
FIG. 1 is a schematic view of an example embodiment of a multi-stage transmission according to the invention.

According to FIGS. 1, 2, 3 and 4 the multi-stage transmission of planetary structure according to the invention comprises a drive input shaft 1 (An) and a drive output shaft 2 (Ab), which are arranged in a housing, and three single-web planetary gearset assemblies P1, P2 and P3, of which the first single-web planetary gearset P1 is preferably made as a positive planetary gearset. The planetary gearset assemblies P2 and P3 are preferably made as negative planetary gear sets. In addition, six rotating shafts 1, 2, 3, 4, 5 and 6 and five shift elements, namely three brakes 03, 04, 05 and two clutches 13, 16 (FIGS. 1 and 2), or two brakes 03, 04 and three clutches 13, 15, 16 (FIGS. 3 and 4) are provided, whose selective actuation two at a time brings about various transmission ratios between the drive input shaft 1 and the drive output shaft 2, so that six forward gears and one reverse gear can be engaged.

As can be seen from FIG. 1, the drive input shaft 1 is connected directly to the solar gear wheel of the first planetary gearset P1 and the web of the first planetary gearset P1 can be put in rotationally fixed connection with, or released from the housing by means of a brake 05. According to the invention, the drive output shaft 2 is connected to the annular gear wheel of the second planetary gearset P2 and to the web of the third planetary gearset P3, and the shaft 3 is permanently connected to the web of the second planetary gearset P2 and to the annular gear wheel of the third planetary gearset P3. Further, the shaft 4 is permanently connected to the solar gear wheel of the second planetary gearset P2 and to the annular gear wheel of the first planetary gearset P1, while the shaft 5 is permanently connected to the web of the first planetary gearset P1 and the shaft 6 permanently to the solar gear wheel of the third planetary gearset P3.

According to the invention, the shafts 3 and 4 can be coupled to the housing by the brakes 03 and 04 respectively; the clutch 13 connects the shafts 1 and 3 to or releases them from one another, and the clutch 16 connects the shafts 1 and 6 to or releases them from one another, while the brake 05 connects the shaft 5 to the housing or releases it therefrom.

Figure 2:
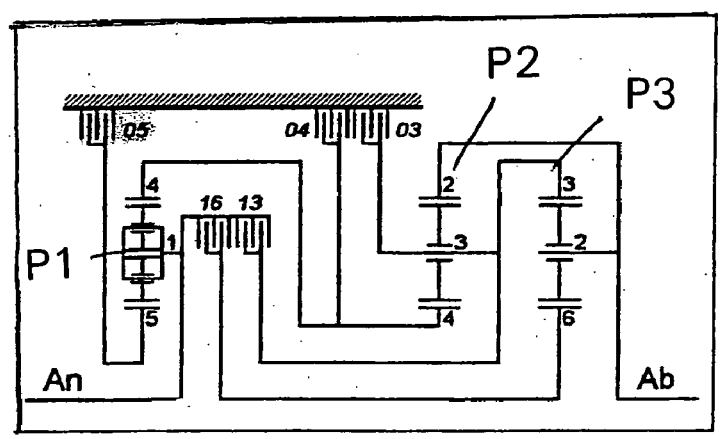
FIG. 2 is a schematic view of a second example embodiment of a multi-stage transmission according to the invention.

The embodiment shown in FIG. 2 differs from the embodiment according to FIG. 1 in that the drive input shaft 1 is connected directly to the web of the first planetary gearset (P1), the solar gear wheel of the first planetary gearset P1 can be connected to or released from the housing by means of a brake 05, and the shaft 5 is permanently connected to the solar gear wheel of the first planetary gearset P1.

Figure 3:
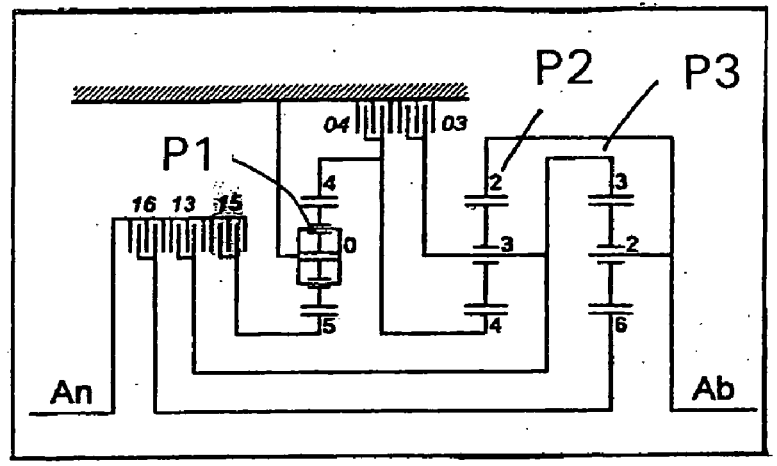
FIG. 3 is a schematic view of a third example embodiment of a multi-stage transmission according to the invention.
Figure 4:
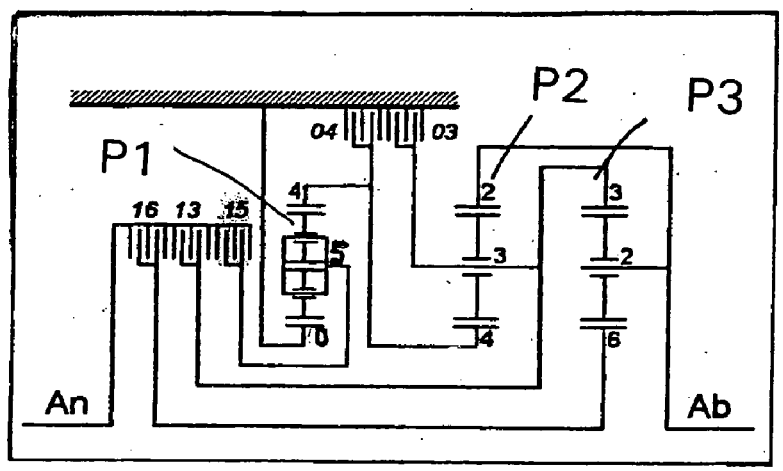
FIG. 4 is a schematic view of a fourth example embodiment of a multi-stage transmission according to the invention.

FIGS. 3 and 4 describe example embodiments of a multi-stage transmission according to the invention, which have three clutches 13, 15, 16 and two brakes 03, 04.

In FIG. 3 the drive input shaft 1 is connected via the clutch 15 to the solar gear wheel of the first planetary gearset P1 and the web of the first planetary gearset P1 is in rotationally fixed connection with the housing (shaft 0). According to the invention, the drive output shaft 2 is connected to the annular gear wheel of the second planetary gearset P2 and to the web of the third planetary gearset P3, and the shaft 3 is permanently connected to the web of the second planetary gearset P2 and to the annular gear wheel of the third planetary gearset P3. As can be seen from FIG. 3, the shaft 4 is permanently connected to the solar gear wheel of the second planetary gearset P2 and to the annular gear wheel of the first planetary gearset P1, the shaft 5 is permanently connected to the solar gear wheel of the first planetary gearset P1, and the shaft 6 permanently to the solar gear wheel of the third planetary gearset P3.

Further, the shaft 3 can be coupled to the housing via the brake 03 and the shaft 4 can be coupled to the housing via the brake 04, the clutch 13 connects the shafts 1 and 3 to or releases them from one another, the clutch 16 connects the shafts 1 and 6 to or releases them from one another, and the clutch 15 connects the shafts 1 and 5 to or releases them from one another.

The embodiment shown in FIG. 4 differs from that of FIG. 3 in that the drive input shaft 1 is connected via the clutch 15 to the web of the first planetary gearset P1, the solar gear wheel of the first planetary gearset P1 is in rotationally fixed connection with the housing (shaft 0), and the shaft 5 is permanently connected to the web of the first planetary gearset P1.

In other embodiments the fixed connection of the web (FIG. 3) or the solar gear wheel (FIG. 4 of the first planetary gearset P1 to the housing can be replaced by a releasable connection, for example a brake.

This enables an electric motor or other suitable additional drive source to be arranged on the shaft 0 released by means of the brake.

The corresponding shift scheme of the example embodiments discussed above is the object of FIG. 5, in which, as examples, transmission ratios i and the resulting speed transitions φ are also indicated.

As shown, the multi-stage transmission according to the invention has a progressive gear variation. Furthermore, when shifting sequentially double-shifts are avoided, since two neighboring gears in each case use only one common shift element. Furthermore, any desired shift between the first and fourth gear and between the fourth and the sixth gear involves the actuation of only one shift element. In the embodiments of FIGS. 1 and 2, for gears 1 to 4 the clutch 16 is permanently actuated; these gears are engaged by the additional actuation of the brake 03 (first gear), the brake 04 (second gear), the brake 05 (third gear) and the clutch 13 (fourth gear). For gears 4 to 6, the clutch 13 remains closed and the gears are engaged by the additional actuation of the brake 05 (fifth gear) and the brake 04 (sixth gear). According to the invention, engaging the reverse gear requires the actuation of the brakes 03 and 05.

The shift scheme for the embodiments of FIGS. 3 and 4 is analogous, with the difference that instead of the brake 05, the clutch 15 is actuated.

Figure 12:
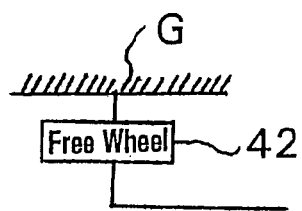
FIG. 12 is a diagrammatic view of an embodiment of the inventive multiple gear transmission having a free wheel.

According to the invention, as shown in FIG. 12, at any suitable point in the multi-stage transmission additional freewheels, e.g., only one freewheel 42 is shown in this Figure, can be provided, for example between a shaft and the housing G or in order to divide or to connect a shaft.

Figure 6:
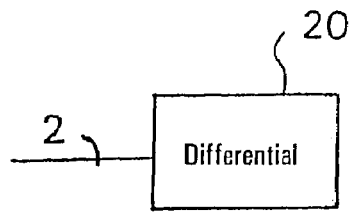
FIG. 6 is a diagrammatic view of an embodiment of the inventive multiple gear transmission having a differential.
Figure 15:
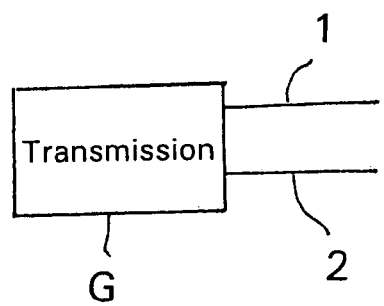
FIG. 15 is a diagrammatic view of a further embodiment of the invention with the input and output are provided on the same side of the transmission housing.

In addition, thanks to the structure according to the invention the drive input and output shafts can be arranged either on the same side of the transmission, as shown in FIG. 15, or on opposite sides. In addition, as shown in FIG. 6 an axle differential or a transfer differential 20 can also be arranged on the drive input or drive output of the transmission.

Figure 7:
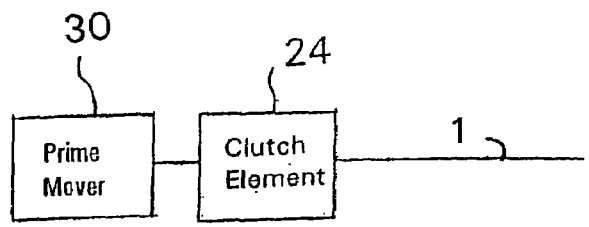
FIG. 7 is a diagrammatic view of an embodiment of the inventive multiple gear transmission with a clutch and a prime mover.

In an advantageous further development the drive input shaft can if necessary be separated from a drive motor or prime mover 30 by a coupling element or clutch element 24, as shown in FIG. 7, and the coupling element can be one of a hydrodynamic converter, a hydraulic clutch, a dry starter clutch, a fluid starter clutch, a magnetic powder clutch or a centrifugal clutch can be used.

Figure 8:
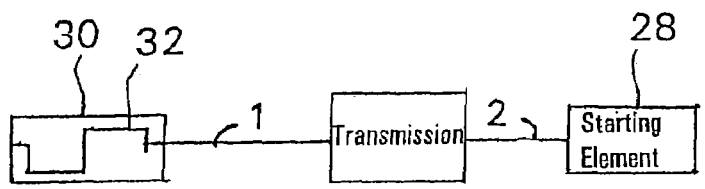
FIG. 8 is a diagrammatic view of an embodiment of the inventive multiple gear transmission having the transmission located between a starting element and a prime mover.
Figure 9:
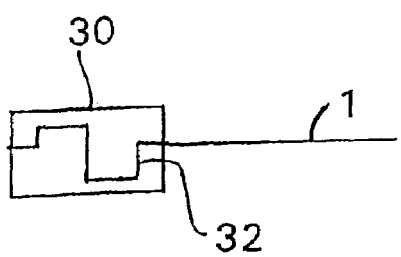
FIG. 9 is a diagrammatic view of an embodiment of the inventive multiple gear transmission for a front-transverse installation with a prime mover.

Such a starting element 28 can also be arranged after the transmission, as shown in FIG. 8, and in that case the drive input shaft is in fixed connection with the crankshaft 32 of the engine or prime mover 30, as shown in FIG. 9. According to the invention, starting can also take place by means of a shift element of the transmission, preferably by means of the brake 04, the brake 03 or the clutch 16.

Figure 10:
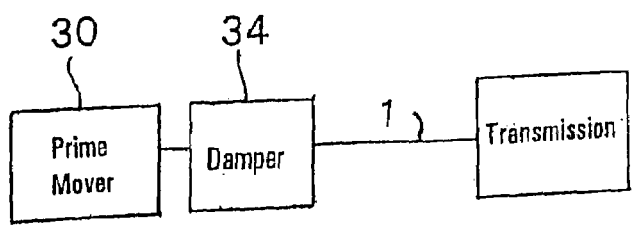
FIG. 10 is a diagrammatic view of an embodiment of the inventive multiple gear transmission having a prime mover and a damper.

The multi-stage transmission, according to the invention, also enables a torsional oscillation damper 34 to be arranged between the engine or prime mover 30 and the transmission, as shown in FIG. 10.

Figure 11:
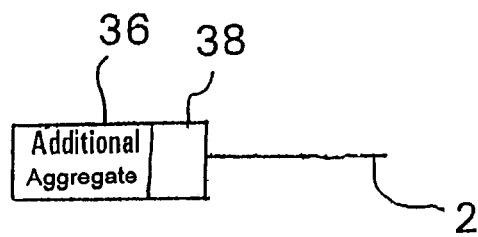
FIG. 11 is a diagrammatic view of an embodiment of the inventive multiple gear transmission with a power take off for an additional aggregate.
Figure 14:
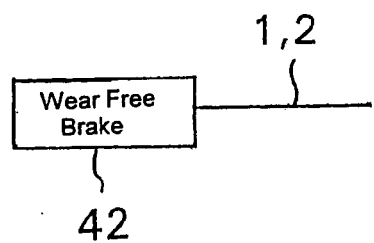
FIG. 14 is a diagrammatic view of a preferred design of the inventive multiple gear transmission having a wear free brake.

In a further embodiment of the invention shown in FIG. 14, a wear-free brake 42 can be arranged on any shaft, preferably in the drive input shaft or the drive output shaft, and this is of particular importance especially for use in commercial vehicles. An auxiliary drive output 38 as shown in FIG. 11, can also be provided on any shaft for driving additional aggregates, only one aggregate 36 is shown in this Figure.

The shift elements used can be made as change-under-load clutches or brakes; however, disk brakes, band brakes and/or conical clutches can also be used. Furthermore, form-enclosing brakes and/or clutches such as synchromesh or claw clutches can be used.

Figure 13:
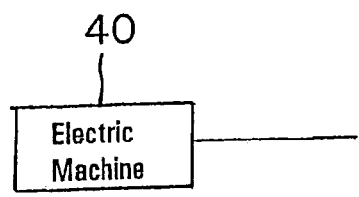
FIG. 13 is a diagrammatic view of an embodiment of the inventive multiple gear transmission with an electric machine.

A further advantage of the multi-stage transmission proposed here as shown in FIG. 13, is that an electric machine 40 can be connected to any shaft as a generator and/or as an additional drive.

Clearly, any design structure and in particular any spatial arrangement of the planetary gearset assemblies and shift elements in their own right and relative to one another, provided it is technically appropriate and does not affect the function of the transmission as indicated in the claims, falls under the protection scope of the present claims even if the said structures are not explicitly indicated in the figures or the description.

REFERENCE NUMERALS

0 Shaft
1 Shaft
2 Shaft
3 Shaft
4 Shaft
5 Shaft
6 Shaft
03 Brake
04 Brake
05 Brake
13 Clutch
15 Clutch
16 Clutch
P1 planetary gearset
P2 planetary gearset
P3 planetary gearset
An Drive input
Ab Drive output
i Transmission ratio
φ Speed change

The invention claimed is:

1. A multistage transmission of planetary structure for a motor vehicle comprising:
 a drive input shaft (1) and a drive output shaft (2) arranged in a housing,
 first, second and third planetary gearset assemblies (P1, P2, P3),
 at least third, fourth, fifth and sixth rotatable shafts (3, 4, 5, 6) and five shift elements (03, 04, 05, 13, 16) comprising only first, second and third brakes (03, 04, 05) supported by the housing and first and second clutches (13, 16),
  wherein the drive input shaft (1) provides a drive input for the multi-stage transmission and is connected directly to a first one of a sun gear wheel of the first planetary gearset assembly (P1) and a web of the first planetary gearset assembly (P1),
  the drive output shaft (2) is connected to an annular gear wheel of the second planetary gear-set assembly (P2) and to a web of the third planetary gearset assembly (P3) and forms a drive output for the multi-stage transmission, the third shaft (3) is connected to a web of the second planetary gearset assembly (P2) and to an annular gear wheel of the third planetary gearset assembly (P3), the fourth shaft (4) is connected to a sun gear wheel of the second planetary gear set (P2) and to an annular gear wheel of the first planetary gearset assembly (P3), the fifth shaft (5) is connected to the second one of the web of the first planetary gear set (P1) and the sun gear wheel of the first planetary gearset assembly (P1), and the sixth shaft (6) is connected to a sun gear wheel of the third planetary gearset assembly (P3), such that the third shaft (3) can be coupled to the housing by the third brake (03), the fourth shaft (4) can be coupled to the housing by the first brake (04), the first clutch (13) can couple the input drive shaft (1) to the third shaft (3), the second clutch (16) can couple the input drive shaft (1) to the sixth shaft (6), and the second brake (05) can couple the fifth shaft (5) to the housing, such that the selective engagement of pairs of the five shift elements results in various transmission ratios between the drive input shaft (1) and the drive output shaft (2) so that six forward gears and one reverse gear can be engaged.

2. The multi-stage transmission according to claim 1, wherein one of an electric machine and an additional drive machine is arranged on a seventh shaft (0) associated with the housing.

3. The multi-stage transmission according to claim 1, wherein the first planetary gearset assembly is formed as a positive planetary gear set and the second and the third planetary gearset assemblies (P2, P3) are formed as negative planetary gear sets.

4. The multi-stage transmission according to claim 1, wherein at least one freewheel is inserted within the transmission.

5. The multi-stage transmission according to claim 4, wherein at least one freewheel is Inserted between at least one of the at least six rotatable shafts (1, 2, 3, 4, 5, 6) and the housing.

6. The multi-stage transmission according to claim 1, wherein the drive input shaft (1) and the drive output shaft (2) are provided on a same side of the housing.

7. The multi-stage transmission according to claim 1, wherein the drive input shaft (1) and the drive output shaft (2) are provided on opposite sides of the housing.

8. The multi-stage transmission according to claim 1, wherein one of an axle differential and a transfer differential is arranged on one of a drive input side and on a drive output side of the housing.

9. The multi-stage transmission according to claim 1, wherein a coupling element facilitates disengagement of the drive input shaft (1) from a drive engine.

10. The multi-stage transmission according to claim 9, wherein the coupling element is one of a hydrodynamic converter, a hydraulic clutch, a dry starter clutch, a liquid starter clutch a magnetic powder clutch and a centrifugal force clutch.

11. The multi-stage transmission according to claim 1, wherein an external starting element is arranged downstream of the housing, such that the drive input shaft (1) is fixedly connected with a crankshaft of a drive engine.

12. The multi-stage transmission according to claim 1, wherein starting takes place by engagement of one of the five shift elements of the transmission, and a crankshaft of a drive engine is permanently connected to the drive input shaft (1).

13. The multi-stage transmission according to claim 12, wherein one of the first brake (04), the third brake (03) and the second clutch 16 is used as a starting element.

14. The multi-stage transmission according to claim 1, wherein a torsional oscillation damper Is arranged between a drive engine and the transmission.

15. The multi-stage transmission according to claim 1, wherein a wear-free brake is arranged on at least one of the at least six rotatable shafts.

16. The multi-stage transmission according to claim 15, wherein a wear-free brake is arranged on at least one of the drive input shaft (1) and the drive output shaft (2).

17. The multi-stage transmission according to claim 1, wherein an auxiliary drive output is arranged on at least one of the at least Six rotatable shafts to drive an additional aggregate.

18. The multi-stage transmission according to claim 17, wherein the auxiliary drive output is arranged on one of the drive input shaft (1) and the drive output shaft (2).

19. The multi-stage transmission according to claim 1 wherein the five shift elements are formed as one of change-under-load clutches and brakes.

20. The multi-stage transmission according to claim 19, wherein at least one of disk clutches, band brakes and conical clutches are used as the five shift elements.

21. The multi-stage transmission according to claim 1, wherein at least one of form-enclosing brakes and clutches are provided as the five shift elements.

22. The multi-stage transmission according to claim 1, wherein an electric machine is connected to at least one of the at least six rotatable shafts as at least one of a generator and an additional drive machine.

23. A multi-stage transmission of planetary structure for a motor vehicle comprising;

a drive input shaft (1) and a drive output shaft (2) arranged in a housing.

first, second and third gearset assemblies (P1, P2, P3); and five shift elements consisting of only first, second and third brakes (04, 05, 03) affixed to the housing and only first and second clutches (13, 16);

the second and the third planetary gearset assemblies (P2, P3) are located adjacent an output shaft end of the transmission;

the first planetary gearset assembly is located adjacent an input shaft end of the transmission;

the first and the second clutches (13, 16) and the first and the third brakes (04, 03) are located between the first and the second planetary gearsets (P1, P2), and the second brake (05) is located adjacent the input shaft end of the transmission, and the input and the output shafts, the first, the second and the third planetary gearset assemblies and the five shifting elements are interconnected so that the selective engagement of desired pairs of five shift elements will result in seven transmission ratios between the drive input shaft and the drive output shaft in which the seven transmission ratios comprise six forward gears and one reverse gear;

the drive input shaft (1) is connected directly to a first one of a sun gear wheel and a web of the first planetary gearset assembly (P1), the second brake (05) facilitates connecting a second one of the web and the sun gear wheel of the first planetary gear set (P1) with the housing, the drive output shaft (2) is connected to an annular gear wheel of the second planetary gearset assembly (P2) and to a web of the third planetary gearset assembly (P3) and forms an output drive for the multi-stage transmission, a third shaft (3) is connected to a web of the second planetary gearset assembly (P2) and to an annular gear wheel of the third planetary gearset assembly (P3), a fourth shaft (4) is connected to a sun gear wheel of the second planetary gear set (P2) and an annular gear wheel of the first planetary gearset assembly (P1), a fifth shaft (5) is connected to one of the web and the sun gear wheel of the first planetary gearset assembly (P1), and a sixth shaft (6) is connected to a sun gear wheel of the third planetary gearset assembly (P3), such that the third shaft (3) can be coupled to the housing by the third brake (03), the fourth shaft (4) can be coupled to the housing by the first brake (04), the first clutch (13) couples the input drive shaft (1) to the third shaft (3), the second clutch (16) couples the input drive shaft (1) to the sixth shaft (6), and the second brake (05) couples the fifth shaft (5) to the housing.

* * * * *